United States Patent
Bali et al.

(10) Patent No.: US 10,382,294 B2
(45) Date of Patent: Aug. 13, 2019

(54) PLATFORM FOR CAPTURING, PROCESSING, STORING, AND PRESENTATION OF GENERIC SENSOR DATA FROM REMOTE ARBITRARY LOCATIONS

(71) Applicant: ORACLE INTERNATIONAL CORPORATION, Redwood Shores, CA (US)

(72) Inventors: Gurbinder Singh Bali, Highlands Ranch, CO (US); Filipe Leahy-Dios, Bracknell (GB); Michael Patrick Rodgers, Orange, CA (US); Shoaib Javed Lal Mohammed Ameerjan, Tamil Nadu (IN)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 14/863,282

(22) Filed: Sep. 23, 2015

(65) Prior Publication Data

US 2016/0094421 A1 Mar. 31, 2016

Related U.S. Application Data

(60) Provisional application No. 62/055,266, filed on Sep. 25, 2014.

(51) Int. Cl.
*H04L 29/06* (2006.01)
*H04L 12/26* (2006.01)
*H04L 12/24* (2006.01)

(52) U.S. Cl.
CPC ............ *H04L 43/04* (2013.01); *H04L 41/022* (2013.01); *H04L 41/14* (2013.01)

(58) Field of Classification Search
CPC ..... G06F 19/32; G06F 19/3406; A61B 5/746; H04L 12/2834; H04L 12/2827; H04L 43/04
USPC ........................................................ 709/223
See application file for complete search history.

(56) References Cited

U.S. PATENT DOCUMENTS

| | | | |
|---|---|---|---|
| 2003/0214921 A1* | 11/2003 | Alapuranen | H04L 45/00 370/328 |
| 2006/0143439 A1* | 6/2006 | Arumugam | G06Q 10/08 713/153 |
| 2007/0294360 A1* | 12/2007 | Ebling | A61B 5/14532 709/208 |
| 2014/0289387 A1* | 9/2014 | Ghosh | H04L 41/0893 709/223 |
| 2015/0381737 A1* | 12/2015 | Quinn | H04L 67/12 709/217 |

* cited by examiner

*Primary Examiner* — Adnan M Mirza
(74) *Attorney, Agent, or Firm* — Vista IP Law Group, LLP

(57) ABSTRACT

Disclosed is a method and mechanism to implement a unified infrastructure for handling IoT components and devices. A platform is provided to integrate, access, and control any type of local device, and to use any type of back-end application to processed collected data from the local devices.

23 Claims, 9 Drawing Sheets

PLATFORM FOR CAPTURING, PROCESSING, STORING, AND PRESENTATION OF GENERIC SENSOR DATA FROM REMOTE ARBITRARY LOCATIONS

CROSS-REFERENCE TO RELATED APPLICATIONS

The present application claims the benefit of U.S. Provisional Application No. 62/055,266, filed on Sep. 25, 2014, which is hereby incorporated by reference in its entirety.

BACKGROUND

The Internet of Things (IoT) concept refers to the interconnection of embedded components and sensors that provide an infrastructure for connectivity of devices, systems, and services. Due to the ubiquitous nature of connected objects in the IoT paradigm, an unprecedented number of devices are expected to be connected to the Internet.

Recent technological advances have brought about an amazing change in the landscape for sensors. The sensors now exist in greater numbers than ever before and have become very inexpensive to build and purchase. In addition, it has become very easy to use sensors for a great number of different applications, such as measurement of temperature, humidity, $CO_2$ levels, GPS, water level, water presence, electrical current/voltage, light, presence, etc. There is almost nothing today that cannot be measured with a simple and cheap sensor.

Many companies are now providing the infrastructure and services to form a connection to the various IoT components and sensors that have now been embedded in various devices. However, known solutions are very rigid with respect to the implementation of the infrastructure to handle acquisition of data from the components and data, and are limited to inflexible, pre-configured data acquisition modalities from the sensors.

Another problem with the existing solutions is that they are implemented using proprietary systems and protocols. Using these proprietary systems forces a customer to essentially throw away much of the investment in the customer's existing IT infrastructure and applications, since the customer is often required to use the systems/applications provided by the vendor for many functions.

Yet another problem with the existing solutions is that they often force a functional separation between the technology that directly interfaces with the IoT components and sensors (referred to hereinafter as "operations technology") and the technology that is used to process the data gathered from the components and components/sensors (referred to hereinafter as "information technology"). Examples of operations technology components include Emergency Shutdown (ESD) systems and Supervisor Control and Data Acquisition (SCADA) systems. Examples of information technology components include Analytics systems and Enterprise Resource Planning (ERP) systems.

Therefore, there is a need for an improved method and mechanism to provide a solution that addresses these and other problems with the current solutions.

SUMMARY

Some embodiments of the invention provide a method and mechanism to implement a unified infrastructure for handling networked components and devices. A platform is provided to integrate, access, and control any type of local device, and to use any type of back-end application to process collected data from the local devices. Localized processing may occur on the client side in a programmatic way, e.g., using rules processing. In addition, rules processing may occur in a coordinated way by implementing rules at both the local gateway and the remote server.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1:
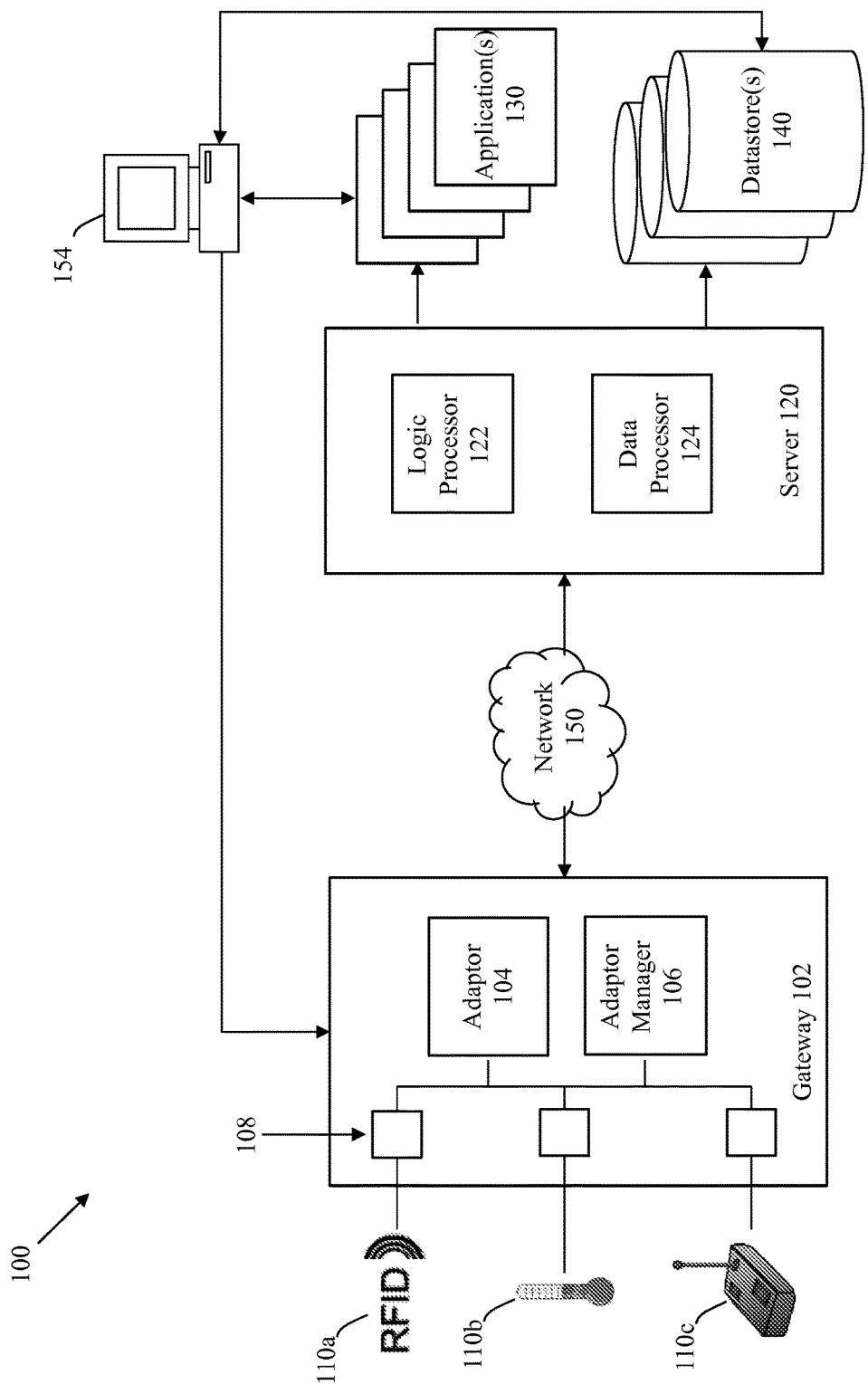
FIG. 1 illustrate an architecture of the inventive platform according to some embodiments of the invention.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise resource planning ("ERP") applications and specific components such as "sensors". It is noted, however, that the invention is not limited in its scope to ERP applications or to just sensor components, and indeed, may be applied to other types of applications and components as well.

Some embodiments of the invention provide a method and mechanism to implement a unified infrastructure for handling networked components and devices. It is noted that the below explanation is made specifically in the context of IoT components and devices. However, the invention is not limited in its scope only to IoT components and devices, and as would be understood by one of ordinary skill in the art, the techniques described herein are readily applicable to other types of components and devices as well.

As noted above, one problem with the existing solutions is that they often force a functional separation between operations technology and the information technology. This creates rigid islands of information that lack the ability to provide interoperability between the two sides, creating inefficiencies due to the inability to share data between the operations tech and the information technology. Moreover, this situation may cause duplication of functionality between the operations technology and the information technology. This creates fragmented systems that have to be forcibly put together.

FIG. 1 shows an architecture 100 of an embodiment of the current invention that addresses these problems, which permits effective integration between the systems in the operations technology portion and the systems in the information technology portion of the environment. The architecture 100 generally includes a gateway portion 102 having front-end data collection logic, and a server portion 120 to perform back-end processing of the collected data. To handle many different device/sensor types and to provide the ability to handle high numbers of units being deployed in the field, the present embodiments provides a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed.

The gateway 102 comprises a sensor management module that handles the sensor code, e.g., that is implemented as custom code (such as Java code) specific to each sensor hardware. This module captures the sensor data in a generic way so that any type of data can be used. The gateway locally caches data so it can be pre-processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, the gateway 102 performs data acquisition and management of local devices 110a-c. The local devices 110a-c may include any type of equipment that can be suitably managed by architecture 100. For example, any number of sensors may be embedded within the local equipment at various sites. Examples of such sensors include RFID sensors at device 110a, temperature sensors at device 110b, and other types of smart devices, beacons, and/or machines at device 110c.

The local devices 110a-c can be configured to send data at regular intervals to the gateway 102. Such data may include information to be captured from the local devices. For example, information that may be captured include operating conditions, metrics, pressure, vibration, temperature, and/or flow rate.

Some non-exhaustive examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

The gateway 102 includes an adaptor component 104 and an adaptor manager 106. The adaptor component 104 (also referred to herein as an "IoT adaptor") manages the gateway's interaction with the local devices 110a-c, and may include device-specific code components 108 to perform its processing with the local devices 110a-c. The adapter manager 106 (also referred to herein as an "IoT adaptor manager") is used to manage the operations, versioning, and/or provisioning of the local devices 110a-c and the adaptor component 104. In some embodiments, the gateway 102 processes incoming data with local analytics, e.g., to analyze operating conditions and to identify fluctuations. To the extent necessary, alerts and data readings can be sent in real-time.

The data collected by the gateway 102 are sent over a network 150 to the server 120. The server 120 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology (OT) side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At the server 120, a logic processor 122 (also referred to herein as an "IoT logic processor") and a data processor 124

(also referred to herein as an "IoT data processor") are provided to implement analysis and alert processing. These components may include operations technology and industry-specific rules and scripts.

The server 120 may communicate with one or more applications 130. Such applications 130 may include, for example, functionality to implement inventory management, quality management, condition-based maintenance, and/or provide a visualization portal. Examples of these applications include, for example, Emergency Shutdown (ESD) systems, Supervisor Control and Data Acquisition (SCADA) systems, data analytics tools, BI (business intelligence) tools, CRM ("customer relationship management") products, ERP ("enterprise resource planning") products, enterprise marketing products, financials applications, and/or procurement applications. The application products are hosted on computing hardware operated by the cloud provider.

The server 120 may also manage the storage of the collected data into one or more datastores 140. The datastore 140 comprises any combination of hardware and software that allows for ready access to the data that is located at a computer readable storage device. For example, the datastore 140 could be implemented as computer memory operatively managed by an operating system. The data in the datastore 140 could also be implemented as database objects and/or files in a file system.

One or more users may exist at one or more user stations 154 that interact with the architecture 100. The user station 154 comprises any type of computing station that may be used to operate or interface with the architecture 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 100, such as a mouse or keyboard to manipulate a pointing object in a graphical user interface to generate user inputs.

Either the server 120 or the user at user station 154 may provide control signals to the gateway 102 to control the operation of the gateway 102 and/or the local devices 110a-c. The control signals may be used to control any operation necessary at the gateway and/or local device 110a-c, including for example, to update and provision control software on the gateway and/or to control operation of the local device.

Figure 2:
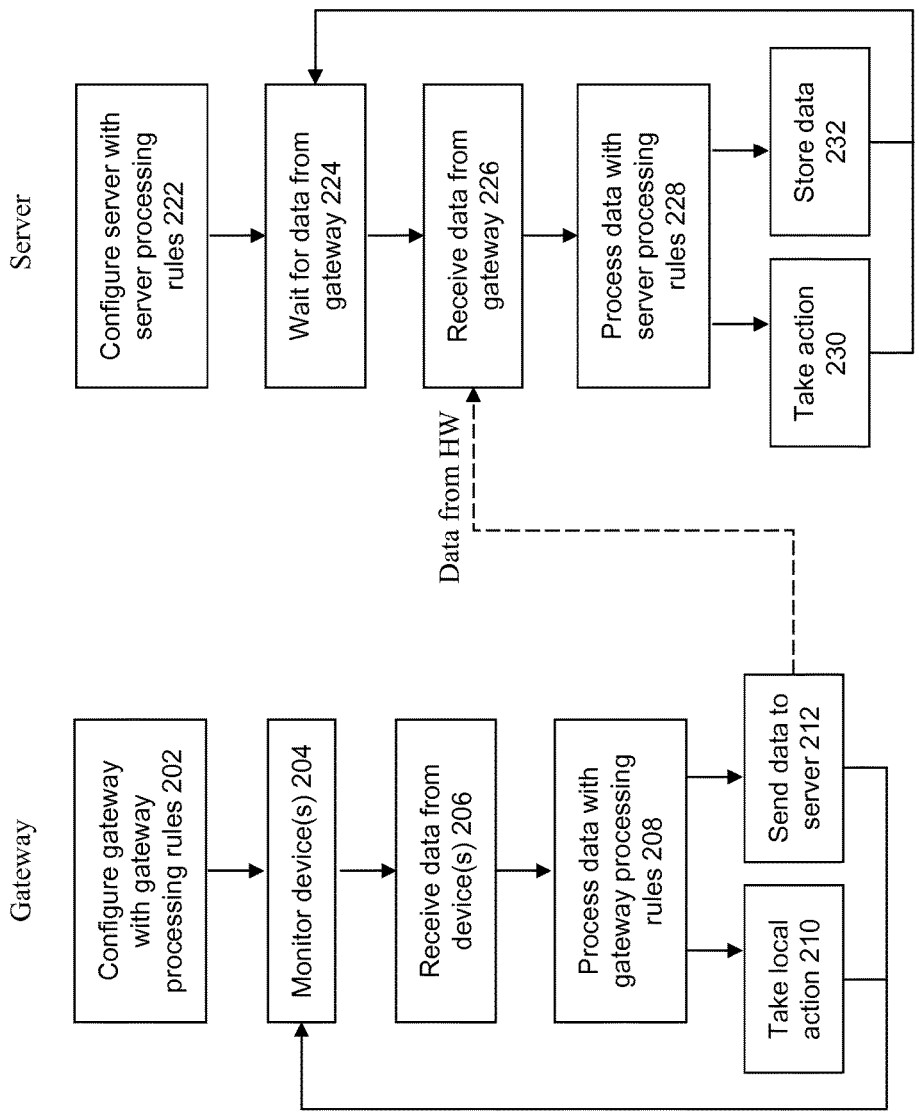
FIG. 2 shows a flowchart of processing that occurs within some embodiments of the invention.

FIG. 2 shows a high level flowchart of processing that occurs within the architecture 100. At the gateway, at 202, the process performs configuration of the gateway with gateway processing rules. One key advantage of some embodiments of the invention is the ability to perform localized processing of data before that data is sent to the server. This localized processing is facilitated by being able to implement processing rules at the gateway for operation of the gateway and/or local devices. In this way, the entirety of the data does not have to be sent over to the server before processing can begin to occur for that data, e.g., to perform device control, analyze device data, perform filtering, or security. This provides a significant advantage over alternative approaches that do not allow such localized processing.

At 204, monitoring occurs for the local devices. In some embodiments directed to sensors, this means that the adaptor begins operations to collect data from the sensors. At 206, data is then received at the gateway from the one or more sensors.

At 208, the gateway then processes the collected data using the gateway processing rules. Any suitable type of processing may be implemented using the processing rules. For example, the rules may be used to provide filtering of data to discard any data deemed unnecessary to be sent to the server, or to throttle the amount and/or type of data to be sent to the server.

In addition, at 210, the local rules may be used to control the initiation of local actions at the client site based at least in part on the collected data. For example, consider the situation where the local device is a temperature monitoring system, and a sensor on the local device provides temperature readings as the collected data. In this situation, a gateway processing rule may establish a set of parameters under which the temperature monitoring system should initiate a local alert, even without waiting for that collected data to be sent to and processed by the remote server, e.g., by setting a threshold temperature level at which a control signal should be sent to the local device to turn on an alert signal (e.g., alter lights, sound, or messaging to local operators).

At 212, the processing at the gateway may also initiate sending of the collected data to the remote server. The transfer to the server may occur using any suitable communications mechanisms. For example, the communications could occur using wireless network connections, cellular connections, and/or mesh network connections (e.g., using the IEEE 8.2.15.4 standard). In some embodiments, the processing rules may be used to select the communications medium for transferring the collected data to the server, e.g., to specify a priority ordering of the different mediums, such as setting a wifi connection as the preferred medium, followed by cellular medium, and then followed by a mesh network connection. The processing rules may also address the situation when a given medium is not available, e.g., to control the local storage and later transfer of the collected data if the local device and/or gateway does not currently have a wireless network connection.

At the server side, at 222, the process performs configuration of the server with server processing rules. This is used at the server to provide configurations for implementing data storage, analysis, and alerting. At 224, the server waits for data to be sent from the gateway 224.

At 226, the collected data from the sensors are received at the server. The received data is then, at 228, processed using the server processing rules. At 230, the processed data may result in the taking of actions at 230, e.g., by sending the data and/or alerts to an application. In addition, at 232, the data can be sent to a datastore for storage.

The rules processing in the system may occur in a coordinated way by implementing the rules at both the local gateway and the remote server. This permits efficient allocation of some processing on a local basis at the gateway while other types of processing are allocated to downstream processing at the server. For example, initial processing that requires less intensive compute tasks may be allocated locally to the gateway (e.g., simple rules with relatively few conditions) while more complex processing is allocated to the server (e.g., rules having extensive levels of conditions to be evaluated). From a rules updating/maintenance point of view, it is relatively more expensive to push rules updates to the local gateways, given the distributed nature of the gateways and the possibly large numbers of gateways in the system. Therefore, rules applied locally at the gateway may be selected and/or configured to require less updates or incur less volatility over time (e.g., for thermostats, implement local rules that do not require constant updates as seasons change). On the other hand, it is relatively less expensive to implement rules updates at the server, and therefore rules allocated to the server include the rules that may be subject to more frequent updates, e.g., temperature monitoring rules that can be frequently tuned for different times or seasons of the year.

Figure 3:
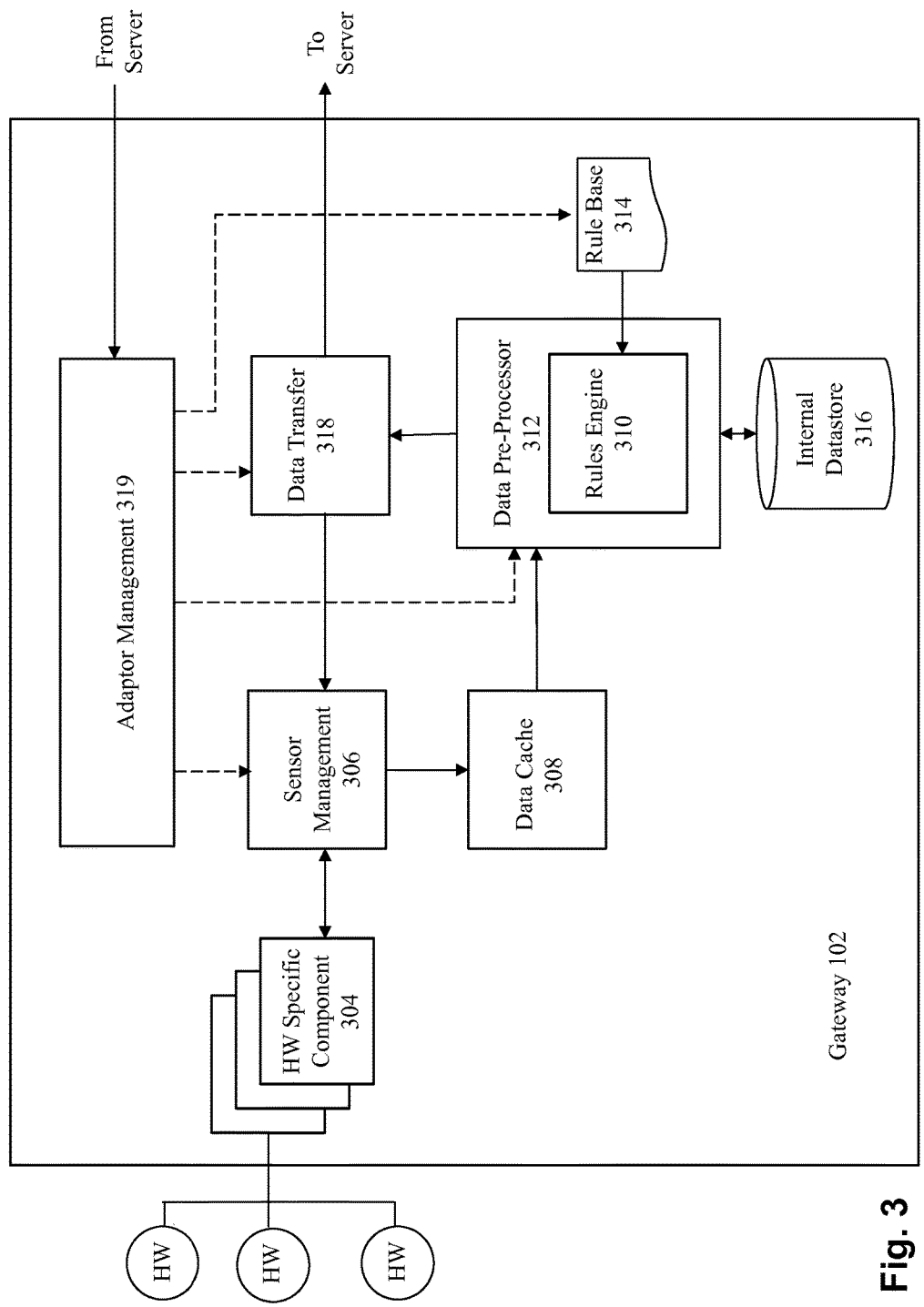
FIG. 3 shows an architecture of a client gateway that can be deployed to implement some embodiments of the invention.

FIG. 3 shows a schematic of a gateway 102 according to some embodiments of the invention. The gateway adapter functionality is implemented by having one or more hardware-specific components 304 that work in conjunction with a set of hardware-agnostic components (306, 308, 312, 316, 318, or 319) that can be used for all types of hardware components. The hardware-specific components 304 are installable to permit sensor management 306 to communicate with each type of local device in the local operating environment. In some embodiments, this is implemented by inserting a layer of code that is configured to use the respective API (applications programming interface) for a given device, and to call the appropriate API calls to perform the desired operation against that device. Each type of device includes its dedicated portion of code to handle operations for that device type.

Sensor management 306 includes the control portions of the gateway 102 to generally perform data collection operations against the local sensors. This component performs actions to talk to the physical sensors and to extract data from the local devices, e.g., by using the hardware-specific components 304. The sensor management component 306 also controls parameters for data acquisition handling with the sensors. For example, the sensor management component 306 controls the refresh intervals for acquiring data from the sensors.

The data cache 308 corresponds to a memory cache device for buffering data received from the local sensors. The issue is that data may be collected from the sensors at a relatively high acquisition rate, whereas downstream processing may occur at a lower processing rate. To avoid bottlenecks, the data cache 308 is useful to buffer the collected data pending any processing that occurs in the subsequent stages at the gateway. It is noted that the data cache may also be used to hold other types of information used at the gateway 102. For example, data for responses from various components in the system may also be held in the data cache 308. In some embodiments, the data cache 308 comprises a FIFO (first-in-first-out) device, which is implemented as an in-memory cache for performing non-blocking I/O operations.

The data pre-processor 312 performs event and data analysis processing upon the collected data. For example, the event processing may be performed to identify sustained threshold breaches and to raise critical alerts. This allows the gateway to perform an in-memory set of processing upon the collected data, and to take action even without waiting for the data to be sent to and analyzed at the server. This also permits a second level of filtering of the collected data (in addition to filtering that occurs at the server). The filtering operations may be used to eliminate the collection and/or transfer of data that are deemed to be irrelevant. For example, for a temperature sensor application, a certain range of "normal" temperature ranges may be deemed irrelevant for escalated collection/transfer, and therefore filtered out from the collected data. In addition, sensor data correctness can be checked at the data pre-processor 312. The pre-processor may also be used to throttle the delivery of data, e.g., to avoid delivering large quantities of repetitious data to the server.

In some embodiments, a rules engine 310 is used to perform rules processing at the data pre-processor. The rules engine 310 may operate in conjunction with a rule base 314. The rules engine 310 may operate with very simple rules, e.g., expressed as "greater than," "less than," or "equal" operations against the collected data. These simple rules can be used to determine which actions to take, determine whether to save or discard data, and to identify a routing destination for the data. In addition, the rules engine 310 may operate using much more complex rules having multiple sets of varying conditions, e.g., expressed as escalating sets of "if-then" conditions. These rules therefore allow control of the local device to be programmable using the rules and/or programming code installed at the gateway. In some embodiments, the rules are implemented as expressions and/or scripts.

The internal data store 316 is used to provide local storage of the collected data at the gateway device. This is useful, for example, if the gateway device loses connectivity to the server, and therefore the internal data store 316 provides a holding location for the data pending reconnection to the server. At the point after the gateway reestablishes the connection to the server, the collected data in the internal data store can then be sent to the server. In some embodiment, a design decision can be made to buffer the collected data in the internal data store, rather than continuously streaming the collected data to the server. This is to avoid, for example, constantly needing to maintain an open connection to the server and/or to avoid using expensive network connections (e.g., cellular connections) and instead waiting until a cheap connection (e.g., wifi connection) is available.

The data transfer component 318 provides a gateway communication adapter that implements communications between the gateway and the server. The data transfer component 318 performs actions to prepare and convert the collected data into an appropriate format for transmission from the gateway to the server. For example, the sensor data can be converted into XML/JSON and then transmitted across the internet to a secure gateway on the server side. The data transfer component 318 can also provide identity management services and access management functionality. For example, the data transfer component 318 in some embodiments performs encryption upon the data before it is transmitted to the server. In addition, the data transfer component 318 performs authentication activities to establish a communications link with the server.

In some embodiments, the data transfer component 318 also performs routing functionality, to determine an appropriate destination from among a plurality of possible destinations. For example, the data transfer component 318 makes an internal/external routing decision, to either send data internally to the sensor management component 306 or externally to a component outside of the gateway. In addition, the data transfer component 318 may select between different external destinations, e.g., to directly communicate with a server (e.g., using wifi networking or cellular networking) or to communicate with a peer gateway over a mesh network.

The adaptor management component 319 provides management functionality for the adapter components on the gateway. The adaptor management component 319 may operate management operations on sensor adapter runtime data to collect and/or operate upon device heart-beats, component memory status, CPU status, and/or last-active information. In addition, the adaptor management component 319 may perform adapter configuration updates, such as adapter descriptor configuration updates, version updates, server updates, sensor bus number updates, and/or collection frequency updates. Moreover, the adaptor management component 319 may perform versioning and updating of the sensor and communications adapters. In some embodiments, the adaptor management component 319 runs/manages local sensor control code, and also handles deployment, starts, and stops of the local control code.

Figure 4:
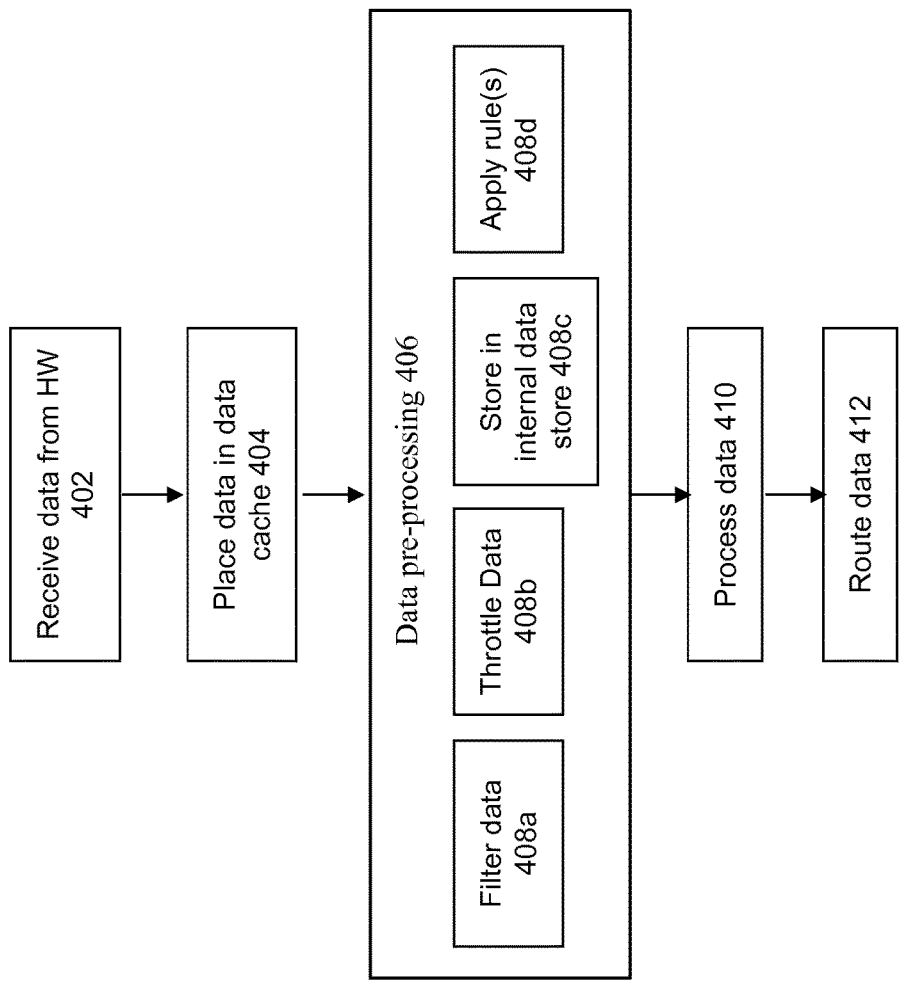
FIG. 4 shows a flowchart of an approach to implement gateway processing according to some embodiments of the invention.

FIG. 4 shows a flowchart of an approach to implement gateway processing according to some embodiments of the invention. At 402, data is captured from the local device, e.g., by reading sensor data on a configured frequency schedule. At 404, that data is placed into the local data cache, e.g., to avoid bottlenecks from capturing the data from the sensors and to also facilitate pre-processing of the data at 406.

Numerous types of pre-processing may be performed at the gateway. For example, at 408*a*, filtering may be applied to filter out certain types of data. In addition, at 408*b*, the data may be throttled so that data rates do not overwhelm the capacities of the client gateway or the network. At 408*d*, rules may also be applied to process the data at the gateway. At 408*c*, the processing may also instruct the gateway to store the data into a local storage location.

The data is then processed for transfer at 410. For example, the data can be formatted into an appropriate format for transmission, e.g., in an XML or JSON format. In addition, data normalization may occur to the data. For example, temperature, date, or time values may be produced using different format from different types of sensors. These may be converted into a normalized, common format at this point. The data may then be routed to an appropriate destination at 412. For example, the data may be sent directly to the server over a wife network, or may be routed through one or more peers over a mesh network.

Figure 5:
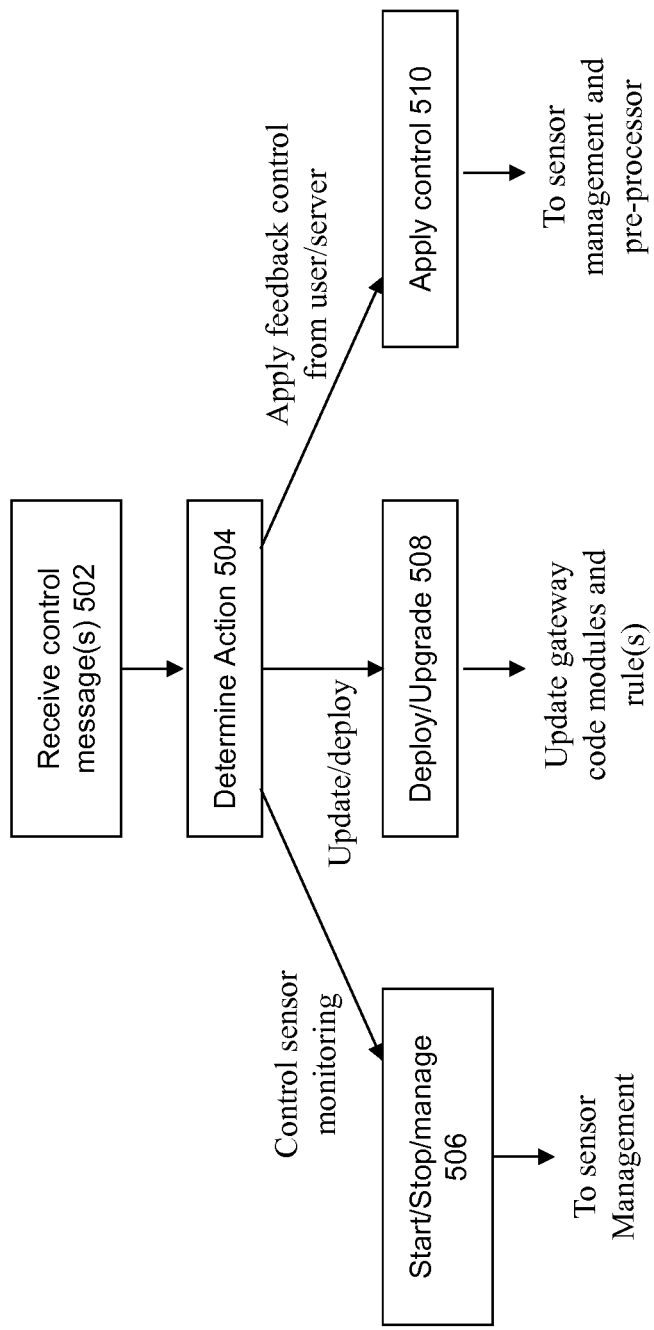
FIG. 5 shows a flowchart of an approach to implement management functionalities on the gateway.

FIG. 5 shows a flowchart of an approach to implement management functionalities on the gateway. At 502, the gateway receives control messages. The control messages may be received from a remote location, such as from the server or a user station. The control message may be sent based upon analysis of data that was sent from the gateway to the server, where analysis of the data necessitated the sending of the control message. The control message may have also been sent to initiate an update or provisioning of a component at the gateway. In addition, the control message may be sent internally from within the gateway, e.g., based upon operation of a processing rule to create a control message in response to an identified condition.

At 504, the control message is processed to determine the specific action to be taken at the gateway. For example, at 506, the specified action could be to control sensor monitoring at the local gateway. Such actions may include, for example, to start, stop, or otherwise perform management actions to the sensor. In this situation, communications may be exchanged with the sensor and/or sensor adaptor to perform these actions.

At 508, the specified action may update a component on the gateway and/or deploy changed code/rules/configurations on a component at the gateway. At 510, the specified action may apply designated control upon a component at the gateway.

Figure 6:
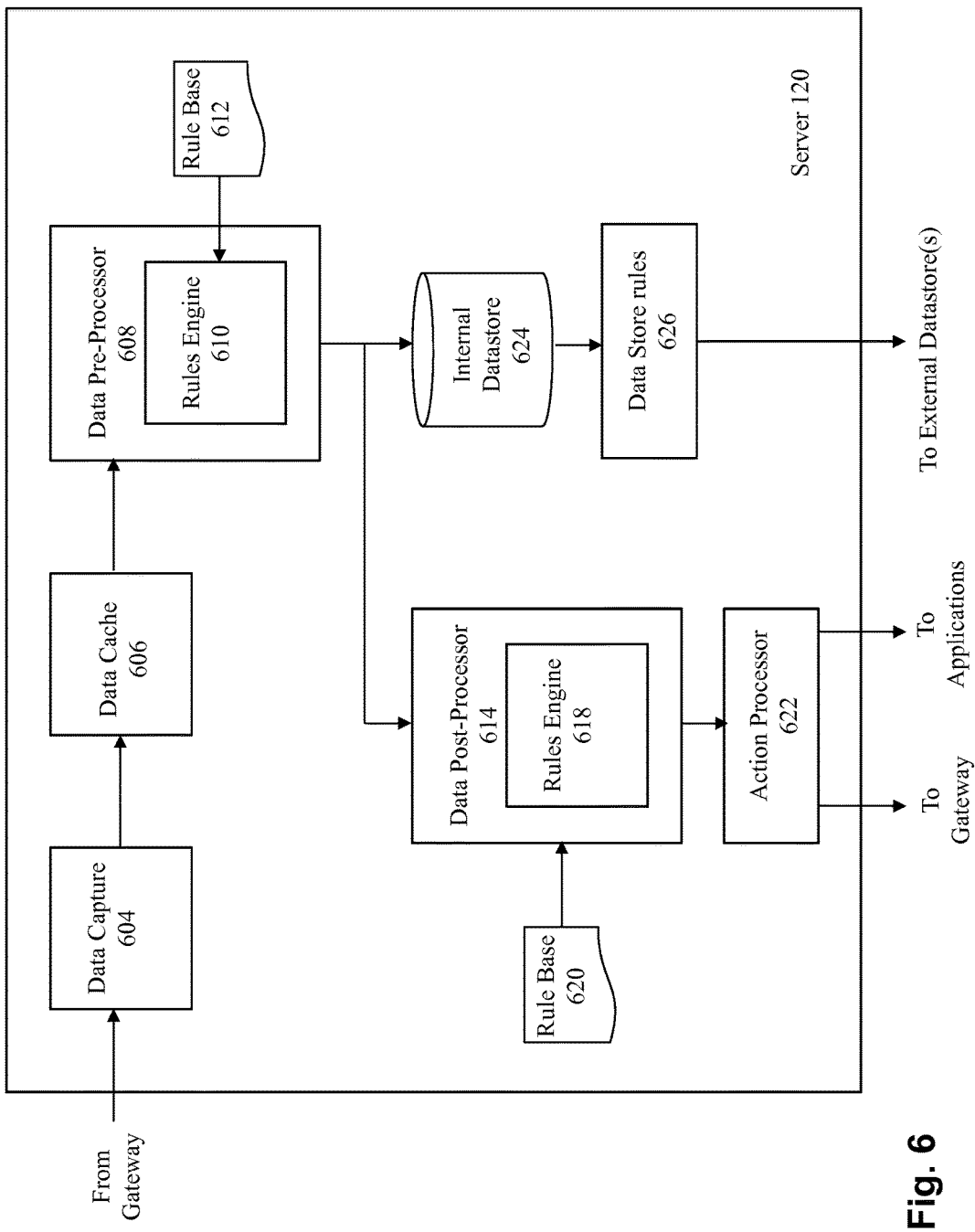
FIG. 6 shows an architecture of a server system that can be deployed to implement some embodiments of the invention.

FIG. 6 shows a schematic of a server 120 according to some embodiments of the invention. The server includes a data capture component 604 to receive data from potentially a multitude of client gateways. The data capture component 604 converts the transport format of the data into a format that is to be directly consumed at the server. For example, the data may be in a JSON format for transport, which is then parsed and converted into a Java object for consumption at the server. A check may also be performed on the incoming data to make sure it is in the correct syntax and/or format. Decryption may be performed on the incoming data if it was encrypted. Checksums may also be checked on the data to make sure it is correct and was not corrupted during transport. Authentication may also occur to make sure the gateway sending the data is authorized to establish communications with the server. In some embodiments, acknowledgements may be sent back to the gateway, e.g., to indicate that the data transfer was successful, unsuccessful, and/or to instruct further actions at the gateway.

The data cache 606 may cache the data locally to expedite data capture. In some embodiments, the data cache 606 corresponds to a memory cache device for buffering data received from the gateways. In some embodiments, the data cache 606 comprises a FIFO (first-in-first-out) device, which is implemented as an in-memory cache for performing non-blocking I/O operations.

The data pre-processor 608 performs preliminary processing upon the received data. For example, pre-processing of the data may be performed for filtering data or applying rules on the data (e.g., simple rules, complex rules, or script-based). In some embodiments, the data pre-processor 608 corresponds to a rules engine 610 that performs rules processing at the data pre-processor. The rules engine 610 may operate in conjunction with a rule base 612. The rules engine 610 may operate with very simple rules, e.g., expressed as "greater than," "less than," or "equal" operations against the collected data. In addition, the rules engine 610 may operate using much more complex rules having multiple sets of varying conditions, e.g., expressed as escalating sets of "if-then" conditions. In some embodiments, the rules may also be implemented as expressions and/or scripts.

An internal datastore 624 may be used to hold the received data. Data store rules 626 may be applied to control the storage configuration and options for the data, e.g., by using Boolean rules to determine whether to persistently store the data in an external enterprise storage ecosystem. The rules may also specific configurations for data compression, data archive, and/or data purges. The rules may also specify where to store the data (e.g., OLTP system, data warehouse, specific application stores, etc.), how to store the data (e.g., with throttling, compression, encryption, etc.), and when to store the data (e.g., using a defined schedule).

The internal datastore 624 may be implemented as a generic table store having a generic table format which is platform-agnostic. By keeping the data in the platform-agnostic format within the enterprise ecosystem, this permits the use of standard tools in an enterprise application to access the data (such as reporting tools and form design tools). This means that users can use their pre-existing tools and systems to process the data from the server side, which allows the user to use systems which they are well-versed in using to report on and add intelligence to the data that is captured.

A data post-processor 614 may be used to perform additional analysis and processing operations on the received data. This is a transaction path to take action upon the data to perform event processing. In some embodiments, the data post-processor 614 corresponds to a rules engine 618 that performs rules processing. The rules engine 618 may operate in conjunction with a rule base 620. The rules engine 618 may operate with very simple rules, e.g., expressed as "greater than," "less than," or "equal" operations against the collected data. In addition, the rules engine 618 may operate using much more complex rules having multiple sets of varying conditions, e.g., expressed as escalating sets of "if-then" conditions. In some embodiments, the rules may also be implemented as expressions and/or scripts.

Using the action processor 622, action orchestration can be performed. The server may take action based on the result of rules applied on the data, such as calling a web service, invoking further more complex rules, sending control data back to devices, identifying sustained threshold breaches, and to raise critical alerts. Various IT applications can then be used to operate upon the received data from the operations technology side. An enterprise application can be used to identify situations that require maintenance services, and to then schedule those services. Historic data collected over time allows the system to understand and implement preventive maintenance. Analytics may be performed to analyze the data, e.g., to perform troubleshooting, and order parts replacements.

Figure 7:
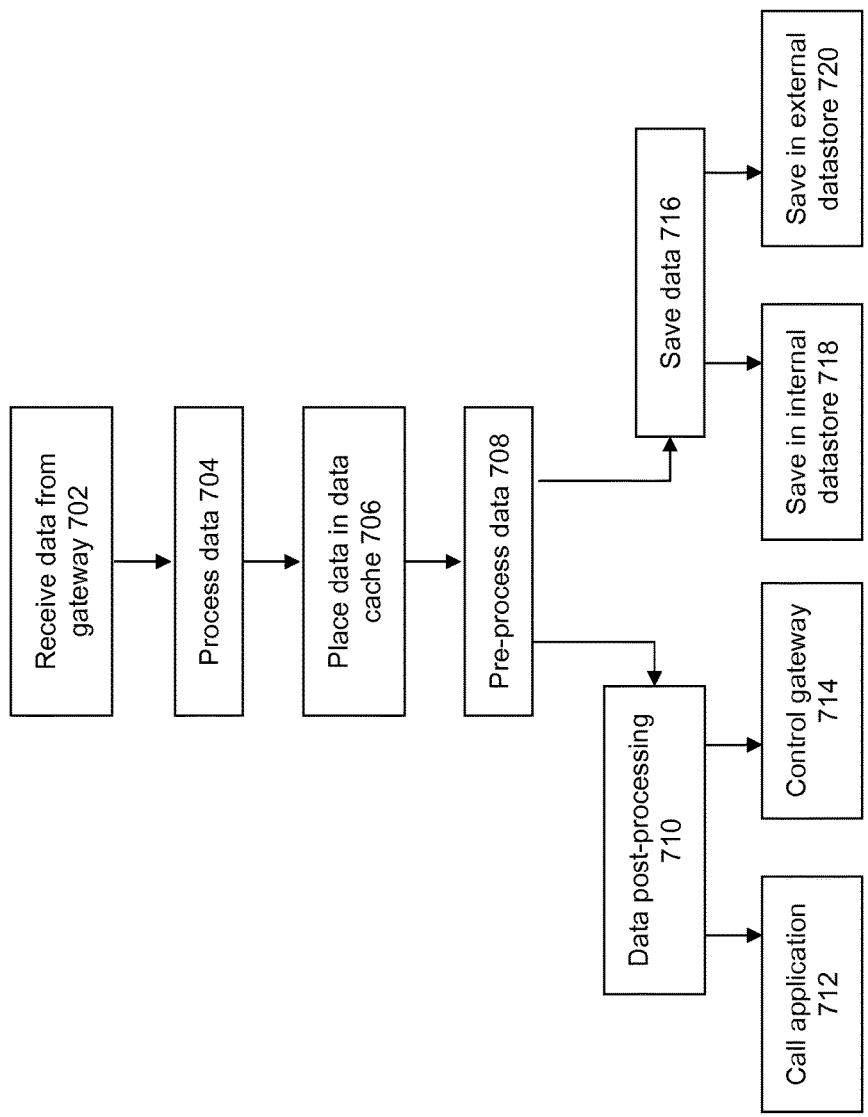
FIG. 7 shows a flowchart of an approach to implement server processing according to some embodiments of the invention.

FIG. 7 shows a flowchart of an approach to implement server processing according to some embodiments of the invention. At 702, sensor data sent from the gateway is received at the server. At 704, that data is processed and converted into a format appropriate or consumption at the server. For example, the data may be converted from a transport format into object formats usable at the server, unencrypted, and/or verified.

At 706, the data is placed into a local data cache at the server, where it is retrieved for pre-processing of the data at 708. Pre-processing may be applied to filter the data, run rules over the data, and perform initial processing.

At 710, data post-processing may be applied to the data, to perform additional analysis and processing operations on the received data. A rules engine may be used to perform rules processing, where the rules engine operates in conjunction with a rule base. Action orchestration may then be performed to take action based on the result of rules applied on the data, such as at 712 invoking one or more applications that can be used to operate upon the received data. For example, an enterprise application can be used to identify situations that require maintenance services and to then schedule those services, review historic data collected over time to implement preventive maintenance, and perform analytics on the collected data, perform troubleshooting, and order parts replacements. In addition, at 714, control signals can be sent back to the gateway to control local gateway/ device operations.

At 716, the data can be stored, e.g., where at 718 the data is stored into an internal datastore. The internal datastore may be implemented as a generic table store having a generic table format that is platform-agnostic. In addition, at 720, the data may be stored into an external datastore.

The embodiments of the invention may be used in conjunction with various types of middleware components. The system components may perform functionality to implement data replication and integration. Event processing may also be performed at the server. In addition, the server may include an expert system with a business rules engine.

Figure 8:
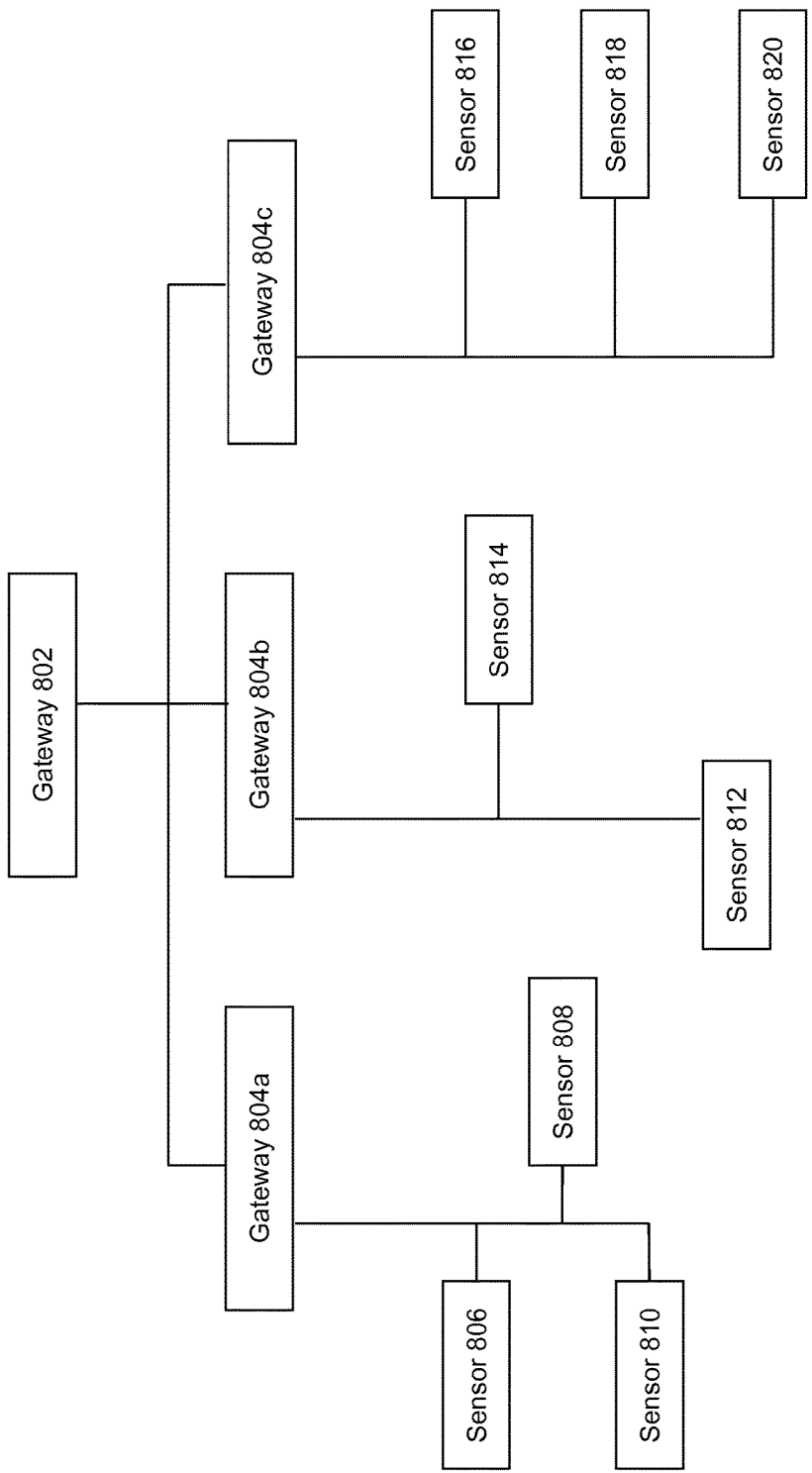
FIG. 8 illustrates distributed gateways and sensors according to some embodiments of the invention.

One advantage of the current approach is that the platform is extremely scalable. As shown in FIG. 8, the system can include additional components to extend the amount of data that is processed. For example, additional gateways 804a, 804b, and 804c can be added to work in conjunction with gateway 802 to handle additional sensors that are added to the system. Here, gateway 804a directly interfaces with sensors 806, 808, and 810, while gateway 804b directly interfaces with sensors 812 and 814, and gateway 804c directly interfaces with sensors 816, 818, and 820. These intermediate gateways then direct their data to central gateway 802, which communicates with the server.

In some embodiments, the server architecture described in FIG. 6 may be logically considered to comprise an event processor having a gateway hookup and base lining, event processor engine, action orchestration engine, and data storage engine. The gateway hookup and base lining perform definitions of the aggregation of sensors to assets, as well as discovery of map assets to a master (e.g., for assets, inventory, and addresses). The Event Processor Engine comprises an interface to define rules, an interface to define expressions, and/or an interface to define scripts.

In some embodiments, monitoring and/or visualization functionality are provided within the system. For example, a sensor health dashboard can be provided to visualize the health of the system, e.g., using data about the system captured by the gateway and transferred to the server. In some embodiments, the sensor health dashboard provides an interface to visualize the gateways for status information (e.g., "Alive," "Dead," "Lack of Sensor Data," "Errant Data"), as well as visualization of the sensors.

In addition, a visualization data feed is provided in the system, e.g., using an open pluggable graphics library via the data feed to visualize the data collected from the sensors. An open interface (e.g., a RESTful interface) may be provide for the captured data to be enquired and allows the development of client interfaces, e.g., to visualize sensor and gateway data in open pluggable libraries. In some embodiments, a visualization data feed corresponds to a graphics visualization plugin to access the REST feed data for visualization.

As just one example, an interface may be composed of a map interface that shows live GPS locations of the sensor(s) and the temperature information, as well as the status of a truck having the sensor (e.g., with different colors for different alert conditions, such as a red color for high temperature).

Some embodiments pertain to an improved approach to implement data definitions for information within the system.

With regards to a sensor definition, some embodiments define an individual sensor using metadata having a combination of (a) ID; (b) type; (c) authentication; and (d) EXT. ID refers to an individual sensor identifier. Authentication refers to required authentication for the sensor (e.g., "None," "Constant," "user/pass," "SSL required"). EXT refers to any additional information that may be required for this specific sensor outside of what is defined in TYPE.

Type refers to a definition of the sensor type, which may include complex definition components. This pertains to one or more data type collections with a name/description. Examples include:

GPS: Collection of 3 Numbers (Latitude, Longitude, Altitude)

Temperature: Collection of 1 Number (Temperature in C)

Environment: Collection of 2 Numbers (Temperature in C, Humidity)

Machine status info: Collection of 1 Text (log data)

Software sensor: Collection of 1 Text (software output)

Image capture: Collection of 1 Binary (image in jpg)

With regards to the server schema, in some embodiments this include metadata having a combination of: (a) sensor ID; (b) type ID; (c) authentication information; (d) EXT ID; (e) description; (f) status; and (g) additional data. The sensor ID field refers to a unique ID for an individual sensor. The type ID identifies a type of sensor. The authentication information field refers to required authentication for the sensor (e.g., "None," "Constant," "user/pass," "SSL required"). The EXT ID portion refers to any additional information that may be required for this specific sensor outside of what is defined in TYPE. The description field provides any additional TYPE for this sensor if necessary or if desired. The description field provides information about the particular sensor. The status field provides status information, such as "active" or "inactive." The additional data field provides any additional data that may be needed, e.g., asset identifier information or system information.

Therefore, what has been described is an improved method and mechanism to implement a unified infrastructure for handling IoT components and devices, where a platform is provided to integrate, access, and control any type of local device, and to use any type of back-end application to processed collected data from the local devices. This platform permits localized processing may occur on the client side in a programmatic way, e.g., using rules processing, as well as rules processing that occur in a coordinated way by implementing rules at both the local gateway and the remote server.

System Architecture Overview

Figure 9:
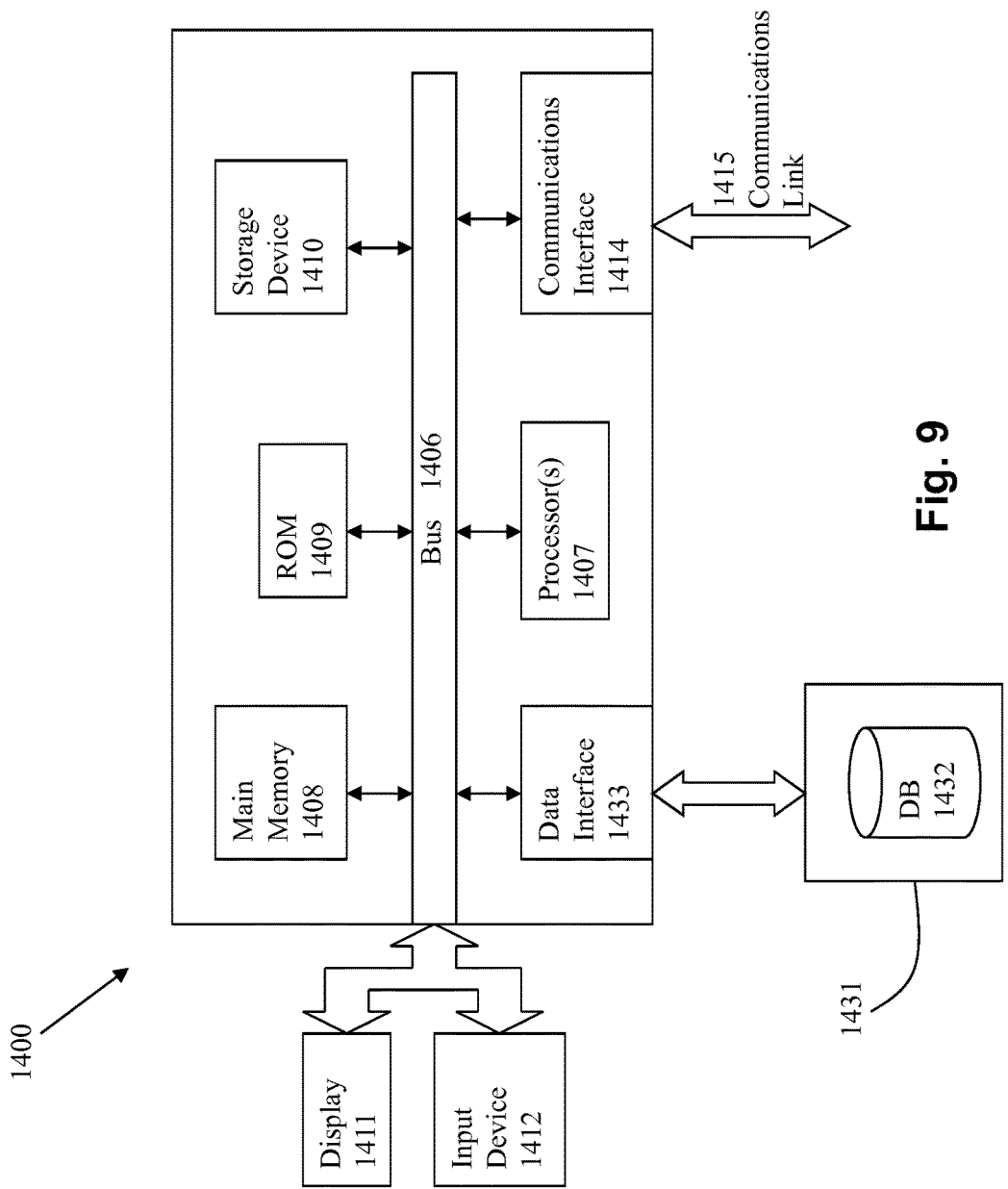
FIG. 9 depicts a computerized system on which an embodiment of the invention can be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for managing networked components, comprising:

managing data collection and analysis from a plurality of local networked components using a gateway device and a server device, the gateway device being coupled between the plurality of local networked components and the server device in a network, the gateway device comprising at least a processor and a memory;

receiving, at the gateway device, collected data from a local networked component of the plurality of local networked components, wherein the collected data is received from a front-end data collection module comprising custom code that is specific to handle data received from different types of local networked components, the custom code collecting data in a generic format from the different types of local networked components, wherein the collected data having the generic format collected from the different types of local networked components are pre-processed at the gateway device;

pre-processing, at the gateway device, the collected data by:

accessing gateway device rules to locally analyze the collected data from the local networked component;

identifying a localized action to take on the gateway device or on the local networked component, the localized action being taken in response to identification of a gateway device rules condition corresponding to the localized action;

generating first filtered data by applying one or more of the gateway device rules to the collected data, the first filtered data being smaller than the collected data; and throttling transmission of the first filtered data to the server device to not overwhelm capacities of the network;

receiving, at the server device, the first filtered data;

processing, at the server device, the first filtered data received at least by:

generating second filtered data by applying server device rules to the first filtered data in a data pre-processing step, the second filtered data being smaller than the first filtered data; and initiating downstream processing of the second filtered data in a post-processing step, the downstream processing of the second filtered data being taken in response to identification of a server device rules condition corresponding to the downstream processing.

2. The method of claim 1, wherein the collected data from a local networked component of the plurality of local networked components is received using a plurality of hardware-specific components of the gateway device, and respective hardware-specific components of the plurality of hardware-specific components supports one or more device types.

3. The method of claim 1, wherein the server device implements data storage rules to control location, storage frequency, or data transformation of the second filtered data when storing the second filtered data into a datastore.

4. The method of claim 1, wherein the gateway device selects from among multiple routing choices to send the first filtered data to the server device, wherein a cost analysis is performed to select a routing choice from among the multiple routing choices.

5. The method of claim 1, wherein the local networked component comprises an internet of things (IoT) device.

6. The method of claim 1, further comprising performing adaptor management to manage updates to the gateway device rules and adaptor code on the gateway device.

7. The method of claim 1, wherein control signals are provided to the gateway device to initiate action on the local networked component.

8. The method of claim 1, wherein the gateway device further comprises a data cache, a sensor management component, an adaptor management component, a data processor component, a data transfer component, and a first datastore, the data cache storing the collected data, the sensor management component controlling refresh intervals for acquiring data from the local network components, the adaptor management component managing updates to gateway device rules adaptor code on the gateway device, the data processor component identifies the localized action and generated the first filtered data, the data transfer component transmits the first filtered data to the server device, and the first datastore storing the first filtered data; and the server device further comprising a data capture component, a data cache, a data pre-processor, a second datastore, a data post-processor, and an action processor component, the data capture component receives the first filtered data, the data cache stores the first filtered data, the data pre-processor generates the second filtered data, the second datastore storing the second filtered data, the data post-processor performing the downstream processing, the action processor component triggering one or more actions at the gateway device and an enterprise application wherein:
the second filtered data is transmitted to an enterprise application and stored in an enterprise application database;
the collected data from a local networked component of the plurality of local networked components is received using a plurality of hardware-specific components of the gateway device, and respective hardware-specific components of the plurality of hardware-specific components support one or more device types, and the respective hardware-specific components comprise application programming interfaces that extract data from corresponding local networked components;

the server device implements data storage rules to control location, storage frequency, or data transformation of the second filtered data when storing the second filtered data into a datastore;
the server device is coupled to a plurality of gateway devices;
the gateway device selects from among multiple routing choices to send the first filtered data to the server device, wherein a cost analysis is performed to select a routing choice from among the multiple routing choices;
control signals are provided to the gateway device to initiate action on the local networked component; and
the local networked component comprises an internet of things (IoT) device.

9. A non-transitory computer-readable medium storing instructions for managing networked components which, when executed by one or more processors, cause the one or more processors to perform operations comprising:
managing data collection and analysis from a plurality of local networked components using a gateway device and a server device, the gateway device being coupled between the plurality of local networked components and the server device in a network, the gateway device comprising at least a processor and a memory;
receiving, at the gateway device, collected data from a local networked component of the plurality of local networked components, wherein the collected data is received from a front-end data collection module comprising custom code that is specific to handle data received from different types of local networked components, the custom code collecting data in a generic format from the different types of local networked components, wherein the collected data having the generic format collected from the different types of local networked components are pre-processed at the gateway device;
pre-processing, at the gateway device, the collected data by:
accessing gateway device rules to locally analyze the collected data from the local networked component;
identifying a localized action to take on the gateway device or on the local networked component, the localized action being taken in response to identification of a gateway device rules condition corresponding to the localized action;
generating first filtered data by applying one or more of the gateway device rules to the collected data, the first filtered data being smaller than the collected data; and
throttling transmission of the first filtered data to the server device to not overwhelm capacities of the network;
receiving, at the server device, the first filtered data;
processing, at the server device, the first filtered data received at least by:
generating second filtered data by applying server device rules to the first filtered data in a data pre-processing step, the second filtered data being smaller than the first filtered data; and
initiating downstream processing of the second filtered data in a post-processing step, the downstream processing of the second filtered data being taken in response to identification of a server device rules condition corresponding to the downstream processing.

10. The non-transitory computer-readable medium of claim 9, wherein the collected data from a local networked component of the plurality of local networked components is received using a plurality of hardware-specific components of the gateway device, and respective hardware-specific components of the plurality of hardware-specific components supports one or more device types.

11. The non-transitory computer-readable medium of claim 9, wherein the server device implements data storage rules to control location, storage frequency, or data transformation of the second filtered data when storing the second filtered data into a datastore.

12. The non-transitory computer-readable medium of claim 9, wherein the gateway device selects from among multiple routing choices to send the first filtered data to the server device, wherein a cost analysis is performed to select a routing choice from among the multiple routing choices.

13. The non-transitory computer-readable medium of claim 9, wherein the local networked component comprises an internet of things (IoT) device.

14. The non-transitory computer-readable medium of claim 9, the operations further comprising performing adaptor management to manage updates to the gateway device rules and adaptor code on the gateway device.

15. The non-transitory computer-readable medium of claim 9, wherein control signals are provided to the gateway device to initiate action on the local networked component.

16. The non-transitory computer-readable medium of claim 9, wherein the gateway device further comprises a data cache, a sensor management component, an adaptor management component, a data processor component, a data transfer component, and a first datastore, the data cache storing the collected data, the sensor management component controlling refresh intervals for acquiring data from the local network components, the adaptor management component managing updates to gateway device rules adaptor code on the gateway device, the data processor component identifies the localized action and generated the first filtered data, the data transfer component transmits the first filtered data to the server device, and the first datastore storing the first filtered data; and
the server device further comprising a data capture component, a data cache, a data pre-processor, a second datastore, a data post-processor, and an action processor component, the data capture component receives the first filtered data, the data cache stores the first filtered data, the data pre-processor generates the second filtered data, the second datastore storing the second filtered data, the data post-processor performing the downstream processing, the action processor component triggering one or more actions at the gateway device and an enterprise application
wherein:
the second filtered data is transmitted to an enterprise application and stored in an enterprise application database;
the collected data from a local networked component of the plurality of local networked components is received using a plurality of hardware-specific components of the gateway device, and respective hardware-specific components of the plurality of hardware-specific components support one or more device types, and the respective hardware-specific components comprise application programming interfaces that extract data from corresponding local networked components;
the server device implements data storage rules to control location, storage frequency, or data transformation of the second filtered data when storing the second filtered data into a datastore;
the server device is coupled to a plurality of gateway devices;
the gateway device selects from among multiple routing choices to send the first filtered data to the server device, wherein a cost analysis is performed to select a routing choice from among the multiple routing choices;
control signals are provided to the gateway device to initiate action on the local networked component; and
the local networked component comprises an internet of things (IoT) device.

17. A system for managing networked components, comprising:
a gateway device and a server device managing data collection and analysis from a plurality of local networked components, the gateway device being coupled between the plurality of local networked components and the server device in a network;
the gateway device comprising at least a first processor and a first memory to hold instructions, the instructions when executed by the first processor performs acts comprising:
receiving, at the gateway device, collected data from a local networked component of the plurality of local networked components, wherein the collected data is received from a front-end data collection module comprising custom code that is specific to handle data received from different types of local networked components, the custom code collecting data in a generic format from the different types of local networked components, wherein the collected data having the generic format collected from the different types of local networked components are pre-processed at the gateway device;
pre-processing, at the gateway device, the collected data by:
accessing gateway device rules to locally analyze the collected data from the local networked component;
identifying a localized action to take on the gateway device or on the local networked component, the localized action being taken in response to identification of a gateway device rules condition corresponding to the localized action;
generating first filtered data by applying one or more of the gateway device rules to the collected data, the first filtered data being smaller than the collected data; and
throttling transmission of the first filtered data to the server device to not overwhelm capacities of the network;
the server device comprising at least a second processor and a second memory to hold instructions, the instructions when executed by the second processor performs acts comprising:
receiving the first filtered data;
processing the first filtered data received at least by:
generating second filtered data by applying server device rules to the first filtered data in a data pre-processing step, the second filtered data being smaller than the first filtered data; and initiating downstream processing of the second filtered data in a post-processing step, the downstream processing of the second filtered data being taken in response to identification of a server device rules condition corresponding to the downstream processing.

18. The system of claim 17, wherein the collected data from a local networked component of the plurality of local networked components is received using a plurality of hardware-specific components of the gateway device, and respective hardware-specific components of the plurality of hardware-specific components supports one or more device types.

19. The system of claim 17, wherein the instructions when executed by the server device implements data storage rules to control location, storage frequency, or data transformation of the second filtered data when storing the second filtered data into a datastore.

20. The system of claim 17, wherein the gateway device comprises a data transfer component that selects from among multiple routing choices to send the first filtered data to the server device, wherein a cost analysis is performed to select a routing choice from among the multiple routing choices.

21. The system of claim 17, wherein the local networked component comprises an internet of things (IoT) device.

22. The system of claim 17, wherein the gateway device further comprises an adaptor manager to manage updates to the gateway device rules and adaptor code on the gateway device.

23. The system of claim 17, wherein the gateway device further comprises a data cache, a sensor management component, an adaptor management component, a data processor component, a data transfer component, and a first datastore, the data cache storing the collected data, the sensor management component controlling refresh intervals for acquiring data from the local network components, the adaptor management component managing updates to gateway device rules adaptor code on the gateway device, the data processor component identifies the localized action and generated the first filtered data, the data transfer component transmits the first filtered data to the server device, and the first datastore storing the first filtered data; and the server device further comprising a data capture component, a data cache, a data pre-processor, a second datastore, a data post-processor, and an action processor component, the data capture component receives the first filtered data, the data cache stores the first filtered data, the data pre-processor generates the second filtered data, the second datastore storing the second filtered data, the data post-processor performing the downstream processing, the action processor component triggering one or more actions at the gateway device and an enterprise application wherein:
the second filtered data is transmitted to an enterprise application and stored in an enterprise application database;
the collected data from a local networked component of the plurality of local networked components is received using a plurality of hardware-specific components of the gateway device, and respective hardware-specific components of the plurality of hardware-specific components support one or more device types, and the respective hardware-specific components comprise application programming interfaces that extract data from corresponding local networked components;
the server device implements data storage rules to control location, storage frequency, or data transformation of the second filtered data when storing the second filtered data into a datastore;
the server device is coupled to a plurality of gateway devices;
the gateway device selects from among multiple routing choices to send the first filtered data to the server device, wherein a cost analysis is performed to select a routing choice from among the multiple routing choices;
control signals are provided to the gateway device to initiate action on the local networked component; and
the local networked component comprises an internet of things (IoT) device.

* * * * *

UNITED STATES PATENT AND TRADEMARK OFFICE
CERTIFICATE OF CORRECTION

PATENT NO.         : 10,382,294 B2
APPLICATION NO.    : 14/863282
DATED              : August 13, 2019
INVENTOR(S)        : Bali et al.

It is certified that error appears in the above-identified patent and that said Letters Patent is hereby corrected as shown below:

In the Specification

In Column 9, Line 34, delete "wife" and insert -- wifi --, therefor.

Signed and Sealed this
Fourth Day of August, 2020

Andrei Iancu
*Director of the United States Patent and Trademark Office*